United States Patent [19]

Geesen et al.

[11] Patent Number: 5,241,700
[45] Date of Patent: Aug. 31, 1993

[54] RECEIVER OF AN ELECTROMAGNETIC SIGNAL WITH A KNOWN NOMINAL FREQUENCY, LIABLE TO BE AFFECTED BY AN UNKNOWN VARIATION, IN PARTICULAR BY THE DOPPLER SHIFT

[75] Inventors: Michel Geesen, Antony; Thierry Potier, Maurepas; Patrick Souty, Beynes; Daniel Wozniak, Les Clayes-sous-Bois, all of France

[73] Assignee: Dassault Electronique, Saint-Cloud, France

[21] Appl. No.: 693,581

[22] Filed: Apr. 30, 1991

[30] Foreign Application Priority Data

May 7, 1990 [FR] France .................. 90 05737

[51] Int. Cl.$^5$ .................. H04B 1/06; H04B 7/00; H03L 7/093; H03L 7/107
[52] U.S. Cl. .................. 455/260; 455/256; 455/264; 331/17
[58] Field of Search .................. 331/17, 2; 329/50; 455/165.1, 180.3, 182.2, 183.1, 196.1, 198.1, 200.1, 255, 208, 256, 209, 260, 264, 314, 315

[56] References Cited

U.S. PATENT DOCUMENTS

| | | | |
|---|---|---|---|
| 4,243,941 | 1/1981 | Zdunek | 329/50 |
| 4,262,361 | 4/1981 | Hauer | 455/315 |
| 4,559,505 | 12/1985 | Suariz et al. | 331/17 |
| 4,635,000 | 1/1987 | Swanberg | 331/17 |
| 4,980,652 | 12/1990 | Tarusawa et al. | 331/17 |
| 5,036,296 | 7/1991 | Yoshida | 331/17 |
| 5,068,625 | 11/1991 | Baker et al. | 331/17 |

FOREIGN PATENT DOCUMENTS 0094837 11/1983 European Pat. Off.
0115152 8/1984 European Pat. Off.

Primary Examiner—Reinhard J. Eisenzopf
Assistant Examiner—Lisa Charouel
Attorney, Agent, or Firm—Christie, Parker & Hale

[57] ABSTRACT

The invention concerns a feedback control loop comprising a mixer comprising a first input receiving an electromagnetic signal, and a second input receiving a first local signal; an intermediate frequency line mounted between the output of the mixer and the input of a phase comparator which receives on a second input a second local signal and has an output; and a feedback line connected between this output and the second input of the input mixer, and comprising a loop filter controlling a variable oscillator for providing the said first local signal as well as a second variable oscillator for providing the second local signal. The loop filter comprises (i) a proportional section mounted between the output and the control input of a second variable oscillator; (ii) an integral variable section mounted between the output of the proportional section and the control input of the first variable oscillator; and controller capable of progressively changing the parameters of the proportional and integral sections so as to progressively reduce the bandwidth of the phase control system and to increase the filtering of the noise and of the interference signals superposed on to the electromagnetic signal.

8 Claims, 6 Drawing Sheets

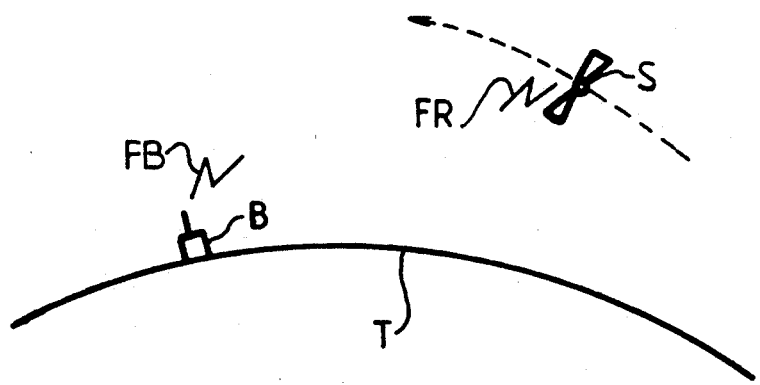
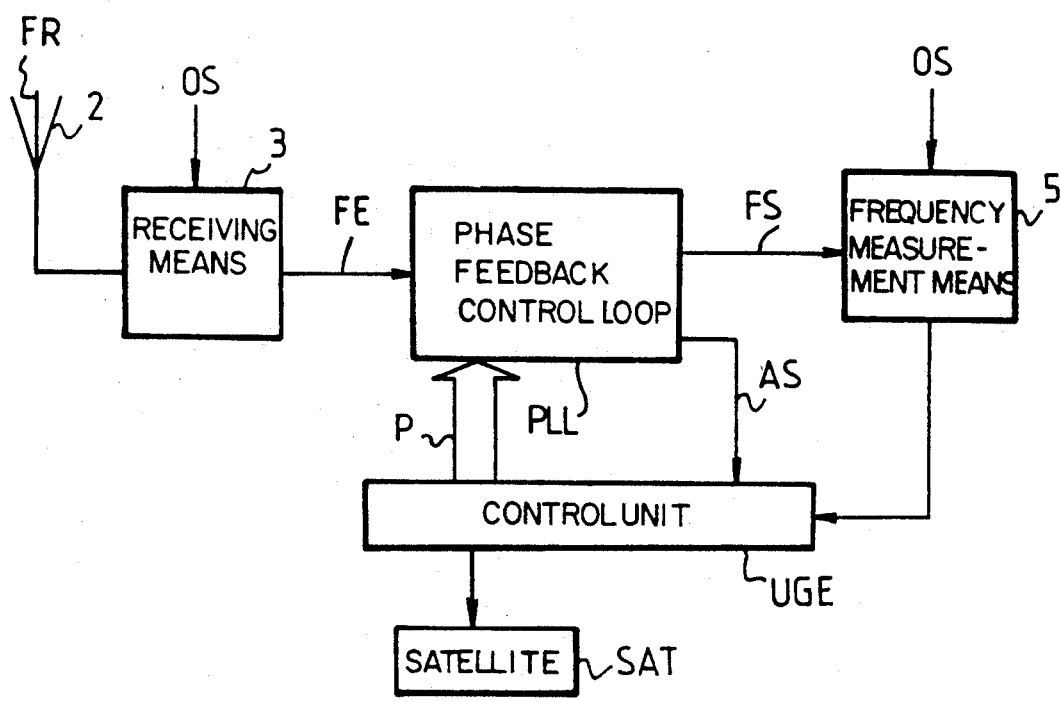
FIG.1
FIG.2

RECEIVER OF AN ELECTROMAGNETIC SIGNAL WITH A KNOWN NOMINAL FREQUENCY, LIABLE TO BE AFFECTED BY AN UNKNOWN VARIATION, IN PARTICULAR BY THE DOPPLER SHIFT

FIELD OF THE INVENTION

The invention concerns the reception of an electromagnetic signal with a known nominal frequency liable to be affected by an unknown variation, in particular by the Doppler shift.

The invention is applicable to the acquisition of the phase of an electromagnetic signal with a known nominal frequency liable to be affected by, in particular, the Doppler shift. This electromagnetic signal, thus affected, will hereinafter be termed the Doppler signal.

The invention applies, more particularly, to a system of tracking satellites or locating beacons on the ground, whose location principle is based on the measurement of the Doppler shift of the signals received by an on-board receiver.

PRIOR ART

Generally, this kind of receiver comprises:
means for receiving an electromagnetic signal with a known nominal frequency liable to be affected by an unknown variation, in particular by the Doppler shift; and
a feedback control loop capable of being set in phase to the real (nominal or preshifted) frequency of the received signal.

In practice, this loop comprises:
an input mixer comprising a first input connected to the receiving means, a second input receiving a first local signal, and an output;
an intermediate frequency line operating in a narrow band centered round a fixed intermediate frequency and mounted between the output of the input mixer and the first input of a phase comparator which receives a second local signal on a second input and has an output; and
a feedback line connected between this output and the second input of the input mixer, and comprising a loop filter controlling a variable oscillator for providing the first local signal.

In practice, the intermediate frequency line comprises a band-pass filter with a narrow pass band receiving the output of the input mixer, and an intermediate frequency amplifier mounted between the output of the band-pass filter and the first input of the phase comparator.

The band-pass filter is of the second order to ensure protection against interference signals and noise, view while allowing the Doppler signal to pass.

OBJECT OF THE INVENTION

The control system is chosen to be at least of the third order to obtain an exact restitution of the phase of the Doppler signal, in spite of the frequency variation of the Doppler signal (Doppler shift) with respect to time.

Moreover, the parameters of the loop filter are variable so as to reduce gradually the bandwidth of the control system and to increase the filtering of the noise superposed onto the Doppler signal.

Consequently, since the time constants of the band-pass filter are added to those of the loop filter, obtaining good stability of the control system determines a specific choice of the parameters of the loop filter which lead to a limitation of the range of the acquisition of the control system, that is to say the maximum deviation between the real frequency of the Doppler signal and the waiting frequency of the feedback control loop. It is the object of the invention to obtain such good stability.

This problem can be solved by means of a feedback control loop of the kind described above.

SUMMARY OF THE INVENTION

According to the main characteristic of the invention, the loop comprises a first variable oscillator, but also comprises a second variable oscillator to provide the second local signal, and the loop filter comprises:
a proportional variable section mounted between the output of the phase comparator and the control input of the second variable oscillator;
an integral variable section mounted between the output of the proportional variable section and the control input of the first variable oscillator; and
control means capable of gradually changing the parameters of the proportional variable section and the parameters of the integral variable section.

Such a design has the advantage of providing a proportional variable feedback that is not distorted by the time constants of the band-pass filter. There follows therefrom an increase in the acquisition range of the loop.

In a particular embodiment of the invention, the intermediate frequency line comprises:
a band-pass filter with a narrow pass band centered around the intermediate frequency and comprising an input connected to the output of the input mixer, and an output;
an intermediate frequency amplifier comprising an input connected to the output of the band-pass filter, and an output; and
the second variable oscillator comprising an additional output in phase quadrature in relation to the second local signal and delivering the intermediate frequency.

In a particular mode of the invention, provision is made for a detection circuit of the phase acquisition, comprising an additional phase comparator whose first input is connected to the output of the intermediate frequency amplifier, whose second input is connected to the additional output of the second variable oscillator, and whose output is connected to filtering means and threshold comparator means capable of delivering a detection signal of the phase acquisition when the input signals of the phase comparator are in phase.

Preferably, each phase comparator is connected to a circuit for the automatic correction of the static phase error of the comparator.

According to another aspect of the invention, the receiver is provided with a circuit for reconstituting the frequency of the received signal comprising: an additional mixer whose first input is connected to the output of the first variable oscillator, whose second input is connected to the output of the second variable oscillator, and whose output delivers the frequency of the received signal comprising the Doppler shift.

In practice, the proportional variable section comprises a first variable gain amplifier whose input is connected to the output of the phase comparator, and whose output is connected to the input of the second variable oscillator.

In practice, the integral variable section comprises:

a first integrator with a variable time constant whose input is connected to the output of the first variable gain amplifier;

a second integrator with a variable time constant whose input is connected to the output of the first integrator; and an adder whose first and second inputs are respectively connected to the outputs of the first and second integrators and whose output is connected to the input of the first variable oscillator.

According to one aspect of the invention, the receiver also comprises a detector of the swing range of the first variable oscillator, comprising:

a first comparator comprising a first input connected to the input of the first oscillator with a variable control voltage, a second input receiving a first reference signal, and an output;

a second comparator comprising a first input connected to the input of the first oscillator with a variable control voltage, a second input receiving a second reference signal, and an output;

an OR gate mounted between the output of the first and second comparators and an input for the control means and delivering at its output a detection signal capable of indicating that the input signal of the first oscillator falls within the frequency range defined by the first and second reference signals, the control means being capable of reinitializing the parameters of the loop filter in the presence of the detection signal.

BRIEF DESCRIPTION OF THE DRAWINGS

Other characteristics and advantages of the invention will emerge in the light of the detailed description given below taken together with the attached drawings wherein:

FIG. 1 schematically illustrates a system of trajectography or a location system on board a satellite using a receiver in accordance with the invention for the acquisition and processing of the signal transmitted by a beacon on the ground;

FIG. 2 illustrates the electronic equipment of the feedback control loop of the receiver in accordance with the invention;

DETAILED DESCRIPTION OF THE PREFERRED EMBODIMENTS

The attached drawings comprise many elements of a definitive nature. They are, therefore, incorporated in the description, not only to provide a better understanding of the description, but also to serve for the definition of the invention, if required.

In FIG. 1, there has been represented a trajectography or location system using a receiver on board a satellite, for the acquisition and processing of the signal FB transmitted by a beacon B on the ground T.

The satellite S moves round the earth and receives a signal FR called the Doppler signal deriving from the transmitted signal FB affected by a Doppler shift.

Reference will now be made to FIG. 2.

The Doppler signal FR received by the antenna 2 of the satellite is transmitted via receiving means 3, after amplification and a change in frequency, to a phase feedback control loop PLL.

On the basis of the characteristics of the satellite, such as its orbit, or its velocity, or on the basis of an internal spectral analysis, the Doppler shift contained in the Doppler signal FR can be evaluated in accordance with the position of the satellite. Thus, an on-board control unit UGE applies to the feedback control loop PLL a presetting frequency P approximating the expected frequency of the received signal FR.

The feedback control loop PLL produces a phase acquisition on the transposed signal FE which is subject to high noise levels and is frequently accompanied by interference signals.

The electrical equipment of the loop PLL comprises an ultra stable oscillator OS situated on board the satellite and capable of delivering frequency signals of the order of several megahertz for changing the frequency of the signal received ahead of the loop PLL and for measuring the frequency of the output signal FS of the loop PLL. For example, the frequency of the output signal FS is measured by frequency measurement means 5, while the on-board control device UGE processes the result of this measurement and transmits it to the satellite SAT.

As will be seen in detail below, a phase acquisition detection signal AS, passed to the control unit UGE, is produced when the phase setting of the feedback control loop has been established.

In response to the signal AS, the bandwidth of the control system is progressively reduced by successive variations of the parameters of the loop filter.

It should here be observed that the output signal FS is the image of the Doppler signal FE with the noise and interference signals removed.

Figure 3:
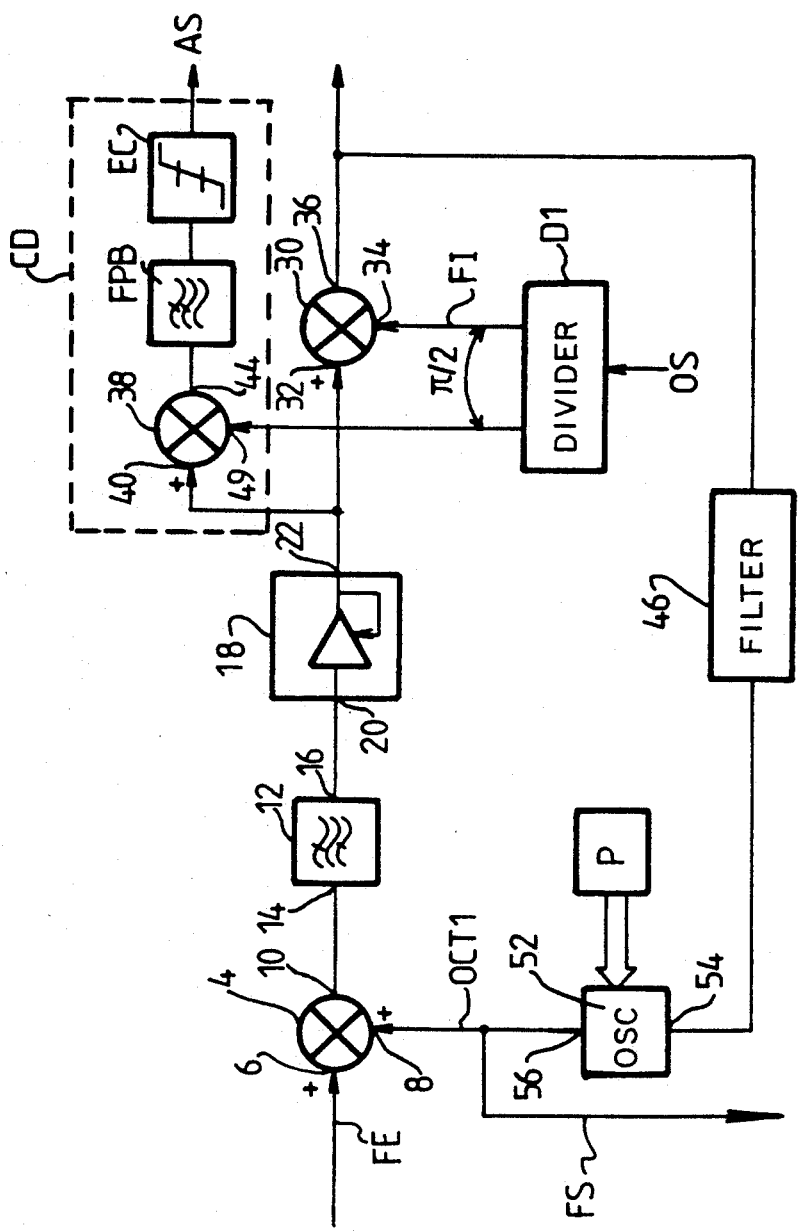
FIG. 3 is a schematic view of the feedback control loop of a known type of receiver.

Reference will now be made to FIG. 3.

The feedback control loop receives the Doppler signal FE coming from the receiving means.

In the known way, the feedback control loop capable of being set to the real frequency of the signal FE comprises an input mixer 4 comprising a first input 6 receiving the Doppler signal FE, a second input 8 receiving a local signal OCT1, and an output 10.

An intermediate frequency line is set up between the output 10 of the input mixer 4 and the input 32 of a phase comparator 30, which receives on a second input 34 a second local signal with a fixed intermediate frequency FI coming from the ultrastable oscillator OS.

In practice, the intermediate frequency line comprises a band-pass filter 12 with a narrow pass band centered around the fixed intermediate frequency FI whose input 14 is connected to the output 10 of the mixer 4 and an intermediate frequency amplifier 18 whose input 20 is connected to the output 16 of the band-pass filter 12.

The intermediate frequency amplifier 18 makes it possible to compensate the variations in level of the received signal FR and determines the operating point of the phase comparator 30. The low signal/noise ratio of the transmission between the beacon and satellite here requires the use of comparators with sinusoidal characteristics.

The band-pass filter 12 is, for example, a piezoelectric filter whose central frequency is, for example, of the order 3.125 MHz with a band width of the order of some hundreds of Hz, for example, of the order of 570 Hz. The nominal frequency FE of the electromagnetic signal is, for example, of the order of 1.25 MHz. The local oscillator OCT1 is preset, for example, around a central frequency of the order of 1.875 MHz.

The detection of the phase coherence is obtained by a phase acquisition detection circuit CD delivering the acquisition state AS when the loop PLL is set in phase to the real frequency of the electromagnetic signal FE.

The phase acquisition detection circuit CD comprises a phase comparator 38 whose first input 40 is connected to the output 22 of the intermediate frequency amplifier 20 and whose second input 44 receives a fixed local intermediate frequency signal FI coming from the stable oscillator via a divider D1 capable of providing two signals at the frequency FI and displaced in phase with respect to each other. Thus, the local signal entering into the comparator 38 is in phase quadrature in relation to the intermediate frequency signal FI entering the comparator 30.

When the input signals of the phase comparator 30 are in phase, the phase acquisition detection signal AS is delivered.

A band-pass filter FPB and a comparator EC with a threshold are connected to the output 44 of the comparator 38 for delivering a direct voltage when the input signals of the comparator 30 are in phase.

A feedback line is connected between the output 36 of the phase comparator 30 and the second input 8 of the input mixer 4. This feedback line comprises a loop filter 46 controlling the variable oscillator (OSC) 52 for delivering the first local signal OCT1.

The loop filter 46 is of the second order and has parameters variable by control means (not represented) for progressively reducing the width of the feedback control loop.

The operation of the receiver, within the scope of an example, such as trajectography or the location of beacons, is as follows.

First of all, the local oscillator OCT1 is preset by way of example to an expected frequency P of the order of 1.875 MHz. Subsequently, the intermediate frequency amplifier 18 is adjusted to permit the compensation of the variations in level of the received signal FR. Finally, the loop filter 46 is validated in the wide bandwidth mode.

When the phase acquisition state AS has been obtained, the filtering parameters of the loop filter are progressively changed to narrow the pass band.

Now the effect of the time constant of the second order band-pass filter 12 is here reflected in a reduction of the phase range of the control system which may lead to a degradation of the stability of the control system. Moreover, the acquisition range is limited to the band of the selective filter 12.

Applicants have set themselves the problem of improving the structure of the feedback control loop so that the degradations occasioned by the selective filter 12 should be attenuated.

This problem is solved by subdividing the filter of the control system into two sections, one of which is not affected by the band-pass filter. Moreover, provision is made for causing the intervention of a second variable oscillator which supplies the second local signal.

Figure 4:
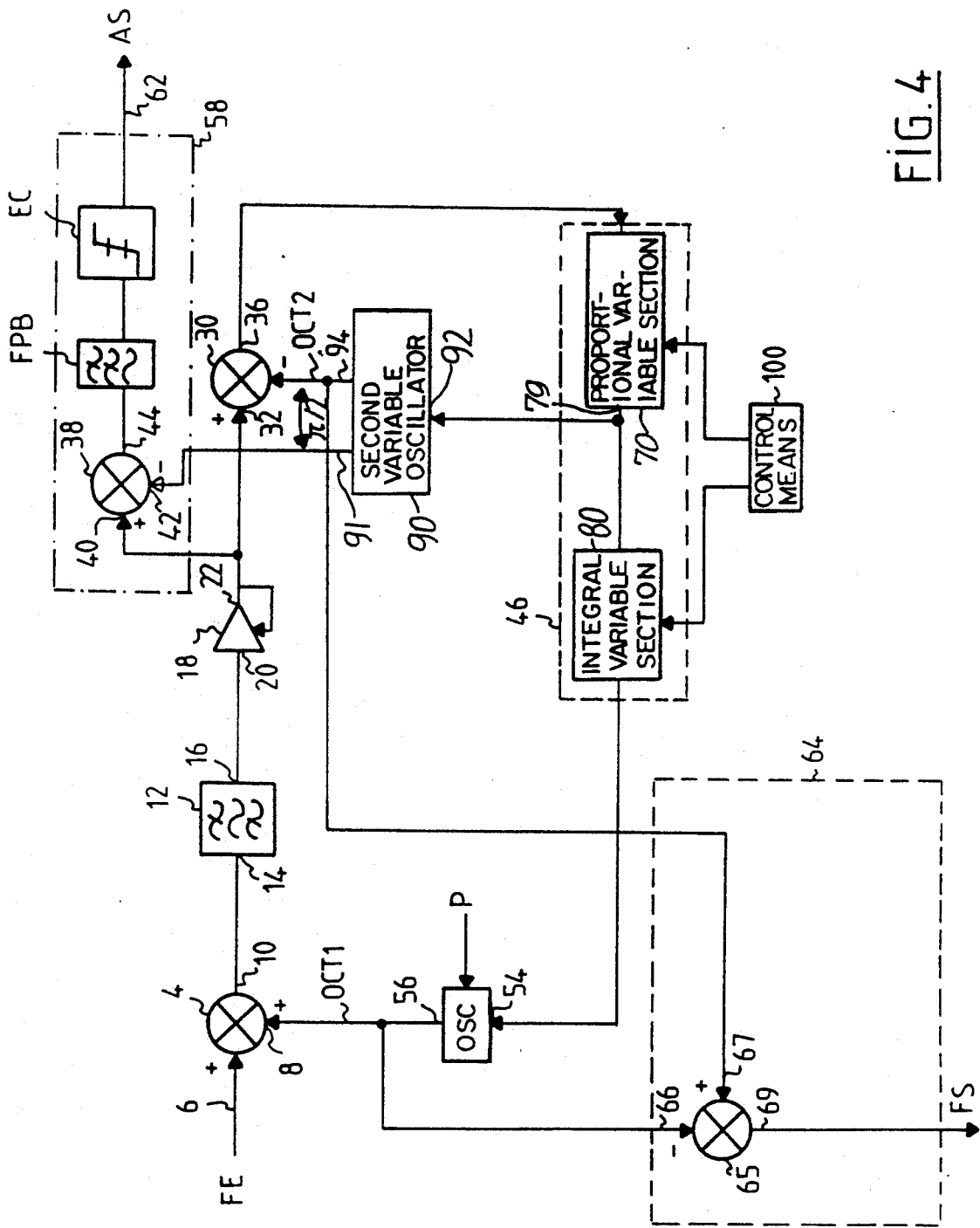
FIG. 4 is a schematic view of the main elements of the feedback control loop in accordance with the invention.

Reference will now be made to FIG. 4. The elements constituting the receiver described with reference to FIG. 3 are here reencountered.

According to a very important characteristic of the invention, the loop filter 46 is subdivided into two variable sections: a proportional variable section 70 mounted between the output 36 of the phase comparator 30 and the control input 92 of a second variable oscillator 90 delivering the second local signal OCT2, and an integral variable section 80 mounted between the output 79 of the proportional variable section 70 and the control input of the first variable oscillator 52 delivering the first local signal OCT1.

Control means 100 progressively changes the parameters of the proportional variable section 70, as well as the filtering parameters of the integral variable section 80.

As will be seen in greater detail below, the advantage of the subdivision of the loop filter lies in the fact that the control system constituted by the proportional variable section controlling the second variable oscillator 90 is not affected by the band-pass filter 12.

According to the invention, provision is made for a circuit 64 for measuring the frequency of the output signal FS and capable of reconstituting the frequency of the signal FE. This measurement circuit 64 comprises a mixer 65 whose first input 66 is connected to the output 56 of the local oscillator 52 and whose second input 67 is connected to the output 94 of the local oscillator 90. The output 69 of the mixer 65 delivers the output signal FS.

The feedback control loop is in step when the phase of the signal FE is equal to the phase difference between the two local signals OCT1 and OCT2. When the loop is in step, the frequency of the output signal FS of the output 69 of the mixer 65 is equal to the frequency of the signal FE and therefore comprises the Doppler shift of the received signal FR.

Provision is also made for a detection circuit 58 substantially identical with the detection circuit CD described with reference to FIG. 3.

However, here, the second input 42 of the phase comparator 38 is connected to the phase quadrature output 91 of the local oscillator 90.

The rest of the structure of the circuit 58 is identical with the circuit CD. In the same way, its operation is identical with that of the circuit CD, that is to say, it delivers at its output 62 the detection signal AS representing the phase setting of the feedback control loop to the frequency FE.

Figure 5:
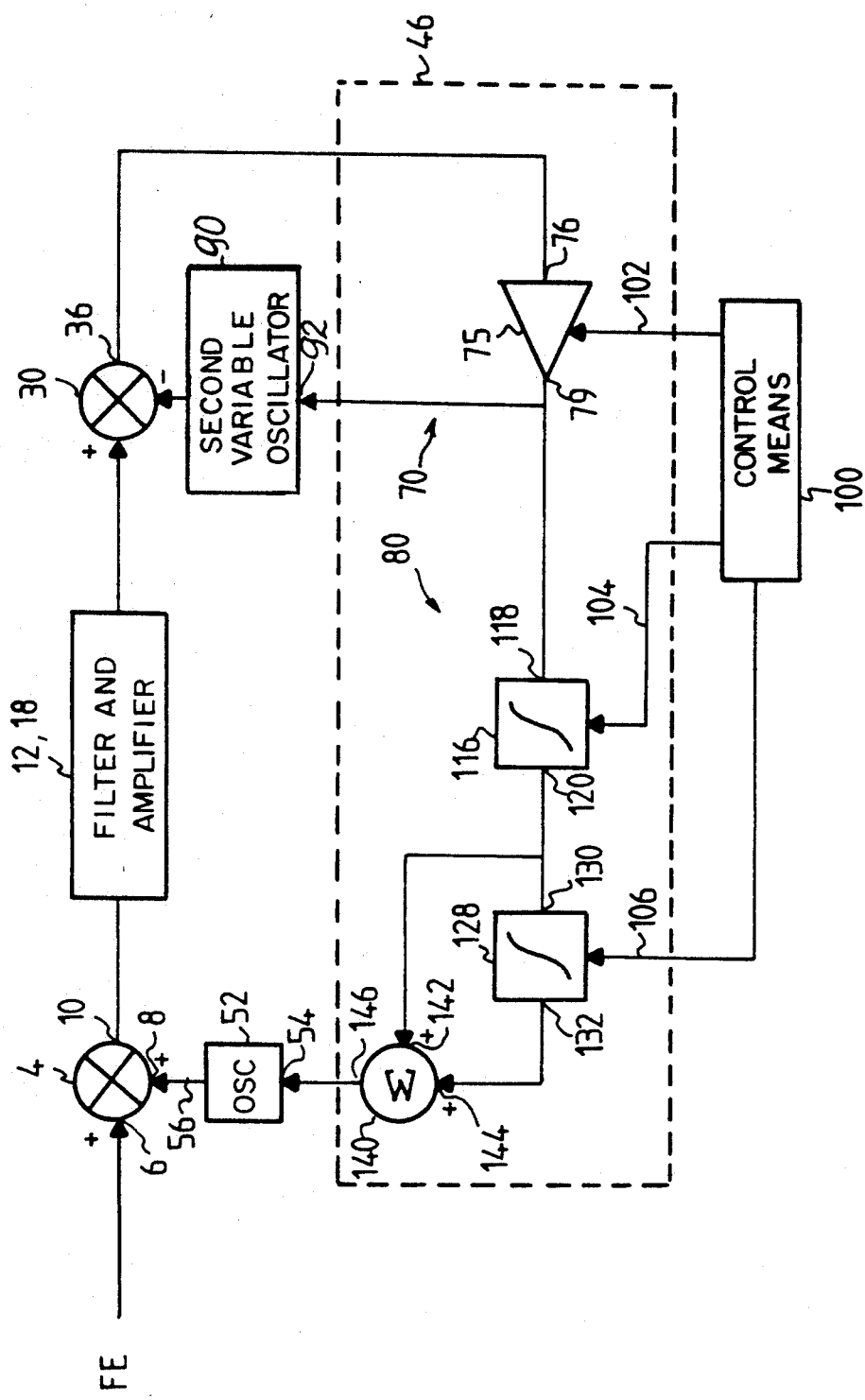
FIG. 5 schematically illustrates a first example of the variation of the filtering parameters of the loop filter in accordance with the invention.

Reference will now be made to FIG. 5 which illustrates in detail a first embodiment of the variation of the filtering parameters of the two variable sections of the loop filter.

The main elements of the receiver described with reference to FIG. 4 will here be reencountered, that is to say, the input mixer 4, the intermediate frequency line mounted between the input mixer 4 and the phase comparator 30, the loop filter 46 and the oscillators 52 and 90.

The loop filter 46 is subdivided into two variable sections 70 and 80.

The proportional variable section 70 comprises an amplifier 75 with a variable gain G1, whose input 76 is connected to the output 36 of the phase comparator 30 and whose output 79 is connected to the input 92 of the second local oscillator 90.

The control means 100 deliver at the output 102 a control signal capable of changing the gain of the amplifier between various values.

It should be observed that in this proportional variable section, a variation of the parameter is given by the variation of the gain G1 of the variable gain amplifier 75.

For its part, the integral variable section 80 comprises two identical variable integrators 116 and 128 connected to each other in series. Each integrator has a plurality of time constants that can be modified by means of control signals 104 and 106 coming from the control means 100. Each integrator has, for example, five distinct values of the time constant.

Provision is made for an adder 140, whose first input 142 is connected to the output 120 of the integrator 116 and whose second input 144 is connected to the output 132 of the integrator 128. The output 146 of the adder 140 delivers a control voltage capable of controlling the variable voltage of the local oscillator 52.

The sequencing of varying the gain of the variable gain amplifier and the time constants of the integrators is as follows.

When the state AS has been obtained at the output of the detection circuit 58 (FIG. 4), the parameters are changed so as to narrow the pass band from the wide band to the narrow band in several stages, for example five, insofar as each variable element has five distinct values.

In the first stage, the variable gain G1 and the time constant of the integrator of the two integrators are initialized at a predetermined value corresponding to a signal acquisition in the wide band.

Insofar as the proportional variable section does not comprise any integrators. This section is faster than the integral section. It follows from this that the actuation of the second variable oscillator 90 occurs before that of the first variable oscillator 52.

For its part, and more slowly to the extent that the integral section comprises two integrators, the variation of the phase obtaining at the output of the comparator 36 is transmitted to the control of the first variable oscillator 52 until the frequency of the output signal FS and the frequency of the signal FE are matched.

The end of this first stage is characterized by the emergence of the acquisition state AS.

In the second stage and up to the fifth stage, the gain G1 and the time constants of the integrators are progressively changed to reduce the band width of the loop.

It is recommended to adapt the amplitude and the moment of variation so as to attain the narrowest band as speedily as possible.

Figure 6:
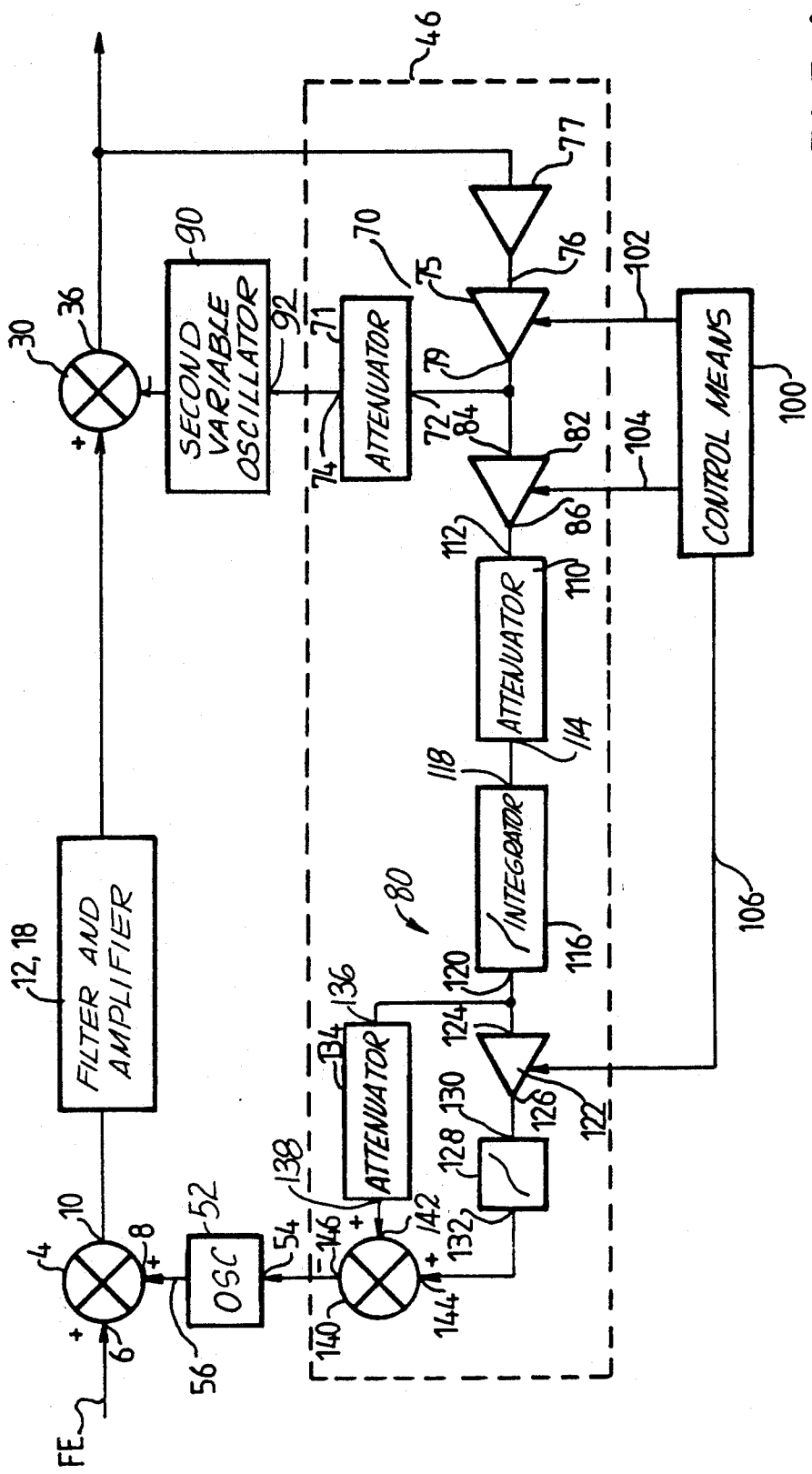
FIG. 6 schematically illustrates a second example of the variation of the filtering parameters of the loop filter in accordance with the invention.

Reference will now be made to FIG. 6 which illustrates in detail a second mode of obtaining the variation of the filtering parameters of the two variable sections of the loop filter.

Here, the main elements of the receiver described with reference to FIGS. 4 and 5 are reencountered, such as the intermediate frequency line 12, 18 mounted between the input mixer 4 and the phase comparator 30, the loop filter 46 and the two oscillators 52 and 90.

The band-pass filter 12 has, for example, a pass band of the order of 570 Hz.

The phase comparator 30 has, for example, a sensitivity of the order of 141 mV/rd.

The proportional variable section 70 comprises an amplifier 75 with a variable gain G1 whose input 76 is connected to the output 36 of the phase comparator 30 and whose output 79 is connected to the input 72 of an attenuator 71 with a fixed attenuation value, for example, of the order of 0.3 which is connected via its output 74 to the input of the second local oscillator 90.

Preferably, an amplifier 77 with a constant gain, for example, of the order of 13.6, is mounted ahead of the variable gain amplifier 75.

The control means 100 deliver at the output 102 a control signal capable of varying the gain G1 between five values respectively of the order of 0.737 (wide band); 0.234; 0.110; 0.055 and 0.034 (narrow band).

For its part, the integral variable section 80 comprises an amplifier 82 with a variable gain G2 whose input 84 receives the output signal 36 via the amplifiers 77 and 75.

The output 86 of the variable gain amplifier 82 is connected to the input 112 of an attenuator 110 with a fixed attenuation value of the order of 0.15.

The input 118 of an integrator 116 with a predetermined time constant is connected to the output 114 of the attenuator 110 with a fixed attenuation value.

The time constant of the integrator 116 is, for example, of the order of 14.1 msec.

The amplifier 82 with a variable gain G2 comprises a plurality of gains that can be changed by means of a control signal 104 coming from the control means 100. The amplifier 82 comprises, for example, five distinct values of G2 respectively of the order of 0.998; 0.308; 0.168; 0.098; and 0.091.

The integral variable section 80 further includes another amplifier 122 with a variable gain G3 whose input 124 is connected to the output 120 of the integrator 116. Another integrator 128 with a predetermined time constant is connected to the output 126 of the variable gain amplifier 122. Another attenuator 134 with a fixed attenuation value, for example, of the order of 0.8, is connected to the output 120 of the integrator 116.

An adder 140, whose first input 142 is connected to the output 138 of the attenuator 134 and whose second input 144 is connected to the output 132 of the integrator 128, delivers at its output 146 a control voltage capable of controlling the variable voltage of the local oscillator 52.

The amplifier 122 with a variable gain G3 is changed over by the actuation of a control signal 106 coming from the control means 100. The amplifier 122 has, for example, five distinct gains G3 respectively of the order of 0.940 (wide band); 0.504; 0.3; 0.226; and 0.171 (narrow band).

The time constant of the integrator 128 is, for example, of the order of 14.1 msec.

The sensitivity of the oscillator 90 is of the order of 500 Hz/V while the sensitivity of the oscillator 52 is of the order of 5900 Hz/V.

The sequencing of the variation of the gains of the variable gain amplifiers is identical to that described with reference to FIG. 5.

Figure 7:
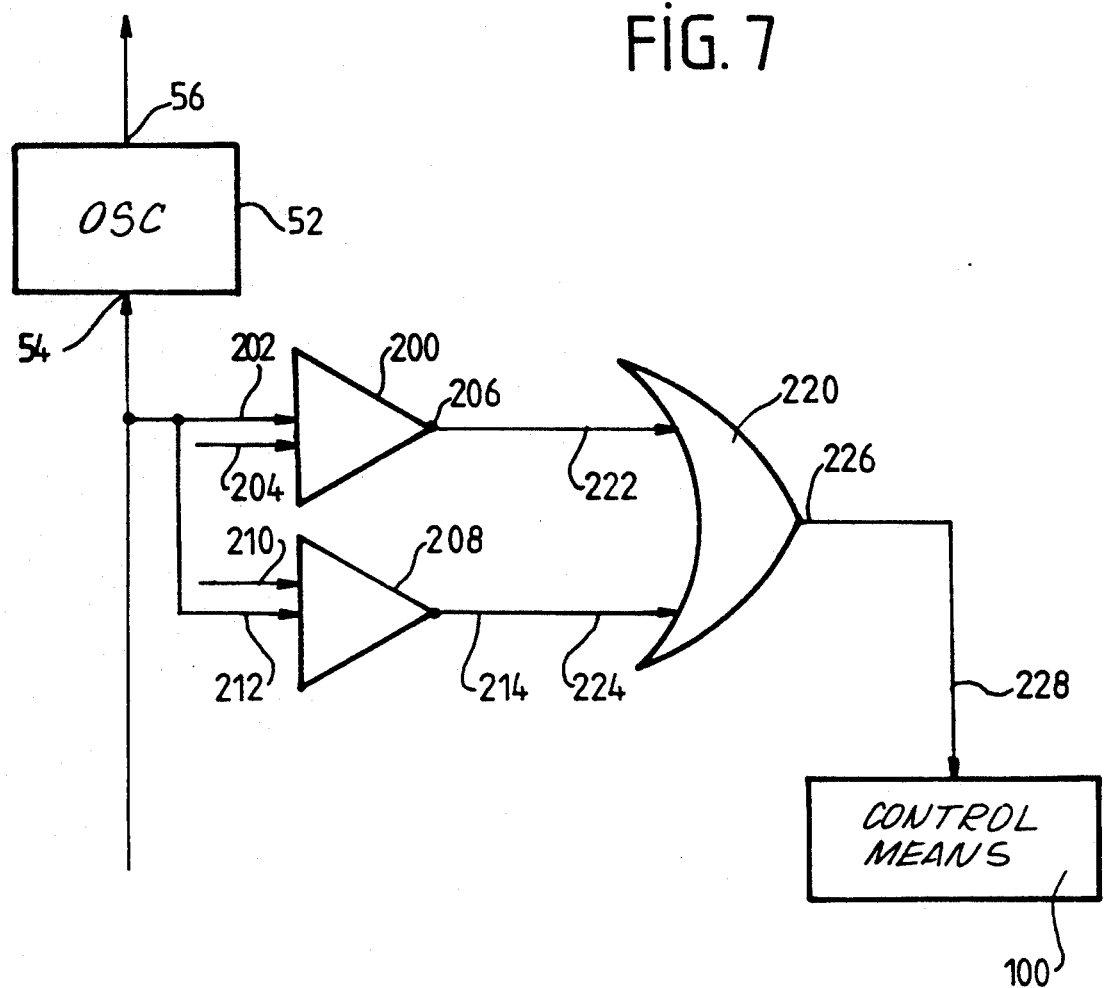
FIG. 7 schematically illustrates the frequency range detector connected to the input of the first oscillator in accordance with the invention.

Reference will now be made to FIG. 7 which illustrates a detector allowing the range of swing of the first local oscillator to be limited.

To limit the range of swing of the local oscillator 52, provision is made for connecting, to the input 54 of the local oscillator 52, a circuit for the detection of the control voltage of the local oscillator 52 in a predetermined frequency range.

In response to the signal delivered by the detection circuit, the control means 100 either proceeds with the variation of the filtering parameters until the narrow pass band of the feedback control loop has been reached in the case where the input voltage 54 is comprised within the range of swing of the oscillator, or return to the first stage of the acquisition when the input voltage is not comprised within the range of swing of the oscillator.

The detection circuit comprises a comparator 200 comprising a first input 202 connected to the input 54 of the oscillator 52 and a second input 204 receiving a first reference signal, and an output 206.

Provision is made for another comparator 208 whose first input 210 receives a second reference signal and whose second input is connected to the input 54 of the oscillator 52.

The output 206 of the comparator 200, and the output 214 of the comparator 208, are respectively connected to the inputs 222 and 224 of an OR gate 220. The output 226 of the OR gate 220 is connected to the input 228 of the control means 100.

When the control voltage at the input 54 is comprised within the range of frequencies delimited by the reference signals 204 and 210, the signal delivered by the OR gate permits the control means 100 to continue with the acquisition until the phase acquisition of the signal FE, indicated by the emergence of the state AS, is obtained.

On the other hand, when the control voltage of the oscillator 52 passes out of the range defined by the two reference signals, the signal delivered by the OR gate causes the control means 100 to return to the beginning of the first stage 1 described above.

Provision is also made for a device for the automatic correction of the offset voltage of the phase comparator 30. This correction device makes it possible to overcome technical component errors, in particular of the phase comparator 30.

Figure 8:
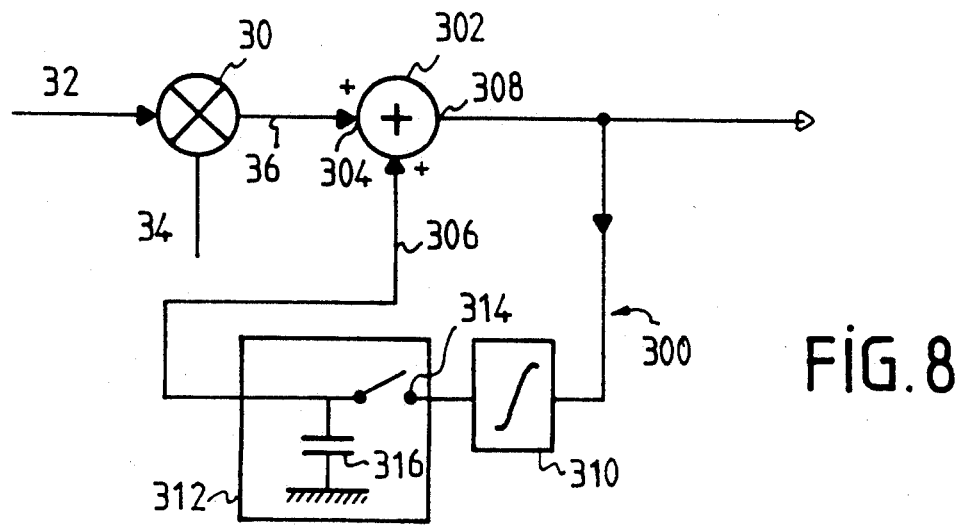
FIG. 8 schematically illustrates an error correction circuit for the static phase comparator in accordance with the invention.

Reference will now be made to FIG. 8.

The correction device 300 comprises a feedback loop comprising an adder 302 whose first input is connected to the output 36 of the phase comparator 30 and whose output 308 is connected to an integrator 310.

A blocking sampler 312, constituted, for example, by a capacitor 316 and a switch 314, is mounted between the output of the integrator 310 and the second input 306 of the adder 302.

In the initialization stage of the phase loop, the signal at the input 32 of the comparator is cut, and the blocking sampler 312 is in the passing mode which allows the output 308 to be set to 0, thanks to the feedback loop.

In the dynamic stage, the Doppler signal is applied to the input 32 of the comparator 30, and the switch 314 is open so as to store the offset correction voltage of the comparator in the capacitor 316.

We claim:

1. A receiver of an electromagnetic signal with a known nominal frequency, liable to be affected by an unknown variation to be accompanied by noise and interference signals, said receiver comprising:

(a) means (3) for receiving said electromagnetic signal;
(b) a feedback control loop (PLL) capable of being set in phase to the known nominal frequency of the received electromagnetic signal, the loop comprising:
  (i) an input mixer (4) comprising a first input (6) connected to the receiving means, a second input (8) receiving a first local signal (OCT1), and an output (10);
  (ii) a first phase comparator (30);
  (iii) an intermediate frequency line (12, 18) operating in a narrow pass band centered around an intermediate frequency and mounted between said output (10) of the mixer (4) and the first phase comparator (30), wherein the first phase comparator receives a second local signal OCT2 on a second input and has an output (36); and
  (iv) a feedback line connected between an output of said intermediate frequency lien and said second input (8) of said input mixer (4), and comprising a loop filter controlling a first variable oscillator (52) for providing the first local signal (OCT1), the first variable oscillator (52) having an input (54),
(c) said loop filter being at least of the second order and having filtered parameters that are variable so as to progressively reduce the bandwidth of the feedback control loop and to increase the filtering of the noise and interference signals, the improvement wherein said feedback control loop comprises a second variable oscillator (90) for providing said second local signal (OCT2) at an output (94) thereof, the second variable oscillator having a control input (92), and wherein said loop filter comprises:
(d) a proportional variable section (70) mounted between said output (36) of the first phase comparator (30) ad the control input (92) of the second variable oscillator, the proportional variable section having gain control parameters;
(e) an integral variable section (80) mounted between an output (79) of said proportional variable section (70) and the input (540 of said first variable oscillator (52); and
(f) control means (100) capable of progressively changing the gain control parameters of the proportional variable section (70) as well as the filtering parameters of the integral variable section (80) in the loop filter.

2. A receiver according to claim 1, wherein the intermediate frequency line comprises:

a band-ass filter (12) with the narrow pass band centered around the intermediate frequency and comprising an input (14) connected to the output (100 of the mixer (4), and an output (16);
an intermediate frequency amplifier (18) comprising an input (20) connected to the output (16) of the band-pass filer (12), and an output (22); and
said second variable oscillator (90) comprising a second output (91) delivering the intermediate frequency in phase quadrature relation to said second local signal.

3. A receiver according to claim 2, including a phase acquisition detection circuit (58) comprising:

a second phase comparator (38) whose first input (40) is connected to the output (22) of the intermediate frequency amplifier (18), whose second input (42)

is connected to the second output (91) of the second variable oscillator (90) and whose output (44) is connected to filtering means (FPB) and threshold comparator means (EC) for delivering a detection signal (AS) indicating that a phase setting of the feedback control loop corresponding to a phase of the received electromagnetic signal when the second local signal and the output of the intermediate frequency amplifier inputted to the first phase comparator are in phase.

4. A receiver according to claim 1, comprising a circuit for reconstituting the known nominal frequency of the received electromagnetic signal, comprising a second mixer (65) whose first input (66) is connected to the output (56) of the first variable oscillator (52), whose second input (67) is connected to the output (94) of the second variable oscillator, and whose output delivers the frequency of the received electromagnetic signal which comprises a Doppler shift.

5. A receiver according to claim 1, wherein said proportional variable section (70) comprises a first variable gain amplifier (75) whose input (76) is connected to the output (36) of the first phase comparator (30) and whose output (79) is connected to the control input (92) of the second variable oscillator (90).

6. A receiver according to claim 5, wherein said integral variable section (80) comprises:
   a first integrator (116) with a variable time constant whose input (118) is connected to the output (79) of said first variable gain amplifier (75);
   a second integrator (128) with a variable time constant whose input (130) is connected to an output (120) of said first integrator (116) and having an output; and
   summation means (140) whose first and second inputs (142, 144) are respectively connected to the respective outputs (120, 132) of said first and second integrators and whose output (146) is connected to the input (54) of the said first variable oscillator (52).

7. A receiver according to claim 1, wherein the first phase comparator (30) comprises an automatic correction circuit of a static phase error of said first phase comparator.

8. A receiver according to claim 1, further comprising a detector of a swing range of the first variable oscillator, the detector comprising:
   (i) a first comparator (200) comprising a first input (202) connected to the input (54) of the first variable oscillator (52) with a variable control voltage, a second input (204) receiving a first reference signal, and an output (206);
   (ii) a second comparator (208) comprising a first input (212) connected to the input (54) of the first variable oscillator with the variable control voltage, a second input (210) receiving a second reference signal, and an output (214); and
   (iii) an OR gate (220) mounted between the outputs (206, 214) of said first and second comparators delivering at its output (226) a detection signal for indicating that the input of said first variable oscillator falls within a frequency range defined by the first and second reference signals, said control means (100) being capable of reinitializing the gain control parameters and filtering parameters for the loop filter in the presence of said detection signal.

* * * * *

UNITED STATES PATENT AND TRADEMARK OFFICE
CERTIFICATE OF CORRECTION

PATENT NO. : 5,241,700

DATED : August 31, 1993

INVENTOR(S) : Michel Geesen; Thierry Potier; Patrick Souty; Daniel Wozniak

It is certified that error appears in the above-indentified patent and that said Letters Patent is hereby corrected as shown below:

ON THE TITLE PAGE:

[56] References Cited, U.S. PATENT DOCUMENTS, change
"4,559,505  12/1985  Suariz et al..331/17" to
-- 4,559,505  12/1985  Suaréz et al..331/17 --.

Column 10, line 20, change "lien" to -- line --.
Column 10, line 39, change "ad" to -- and --.
Column 10, line 44, change "(540" to -- (54) --.
Column 10, line 53, change "band-ass" to -- band-pass --.
Column 10, line 55, change "(100" to -- (10) --.
Column 10, line 59, change "filer" to -- filter --.

UNITED STATES PATENT AND TRADEMARK OFFICE
CERTIFICATE OF CORRECTION

PATENT NO. : 5,241,700
DATED : August 31, 1993
INVENTOR(S) : Michel Geesen; Thierry Potier; Patrick Souty; Daniel Wozniak It is certified that error appears in the above-indentified patent and that said Letters Patent is hereby corrected as shown below:

Column 11, line 6, change "corresponding" to --corresponds--.

Signed and Sealed this

Seventeenth Day of May, 1994

Attest:

BRUCE LEHMAN

*Attesting Officer*      *Commissioner of Patents and Trademarks*